United States Patent [19]

Beck et al.

[11] Patent Number: 5,431,245
[45] Date of Patent: Jul. 11, 1995

[54] HYDROSTATIC AXIAL PISTON MOTOR FOR FITTING IN THE HUB OF A DRIVEN WHEEL

[75] Inventors: Josef Beck, Haigerloch; Gerhard Beutler, Nagold; Karl-Heinz Jakubowski, Castrop-Rauxel; Hartwig Pfordt, Witten, all of Germany

[73] Assignees: Brueninghaus Hydraulik GmbH, Horb; Lohmann & Stolterfoht GmbH, Witten, both of Germany

[21] Appl. No.: 190,210
[22] PCT Filed: Jul. 16, 1992
[86] PCT No.: PCT/EP92/01611
§ 371 Date: Jun. 20, 1994
§ 102(e) Date: Jun. 20, 1994
[87] PCT Pub. No.: WO93/04281
PCT Pub. Date: Mar. 4, 1993

[30] Foreign Application Priority Data

Aug. 22, 1991 [DE] Germany ............ 41 27 817.8

[51] Int. Cl.⁶ ............................... B60K 7/00
[52] U.S. Cl. ................. 180/308; 180/242
[58] Field of Search ............... 180/6.48, 24.07, 65.5, 180/242, 305, 307, 308, 367; 475/83

[56] References Cited

U.S. PATENT DOCUMENTS

| | | |
|---|---|---|
| 3,762,488 | 10/1973 | Dammon ............... 180/308 |
| 3,954,026 | 5/1976 | Rittmann et al. ........ 180/308 X |
| 4,162,713 | 7/1979 | Heitman et al. ........ 180/308 X |
| 4,213,514 | 7/1980 | Ehrlinger et al. ....... 180/308 |
| 4,930,590 | 6/1990 | Love et al. ............. 180/308 X |

FOREIGN PATENT DOCUMENTS

| | | |
|---|---|---|
| 0128104 | 12/1984 | European Pat. Off. . |
| 2431385 | 2/1980 | France . |
| 2628039 | 9/1989 | France . |
| 2744936 | 4/1979 | Germany . |
| 3235378 | 3/1984 | Germany . |
| 3905292 | 8/1990 | Germany ............ 180/308 |
| 0293780 | 9/1991 | Germany ............ 180/242 |
| 9147154 | 8/1984 | Japan . |
| 1374752 | 11/1974 | United Kingdom . |
| 1425101 | 9/1988 | U.S.S.R. ............ 180/308 |

OTHER PUBLICATIONS

RexRoth Hydromatic, "Axialkolbeneinheit Typ PMV2A1", 1973, Engineering Bulletin No. RD 12733, pp. 1–4. (No translation).

Primary Examiner—Brian L. Johnson
Attorney, Agent, or Firm—Scully, Scott, Murphy & Presser

[57] ABSTRACT

An axial piston motor of adjustable swept volume for installation in a wheel hub, having a motor housing which is open on one side and is closed by a connection block, an output shaft rotatably mounted in the housing and a connection block, an adjusting device for adjusting the swept volume, a step-down gear unit driven by the output shaft and having a driving toothed wheel for the drive of the wheel hub, and a brake associated with the output shaft on the connection block. For the purpose of reducing the outlay in terms of construction, with comparatively compact dimensions, and for greater ease of external access to the adjusting device, the step-down gear unit (13) is arranged inside the motor housing (1, 3) with two-sided mounting of the driving toothed wheel (47) and the connection block (5) is set back radially with respect to the motor housing (1) and the adjusting device (28, 29, 30) is arranged so as to be freely externally accessible in the region (23) of the motor housing (1, 2) that is free of covering.

7 Claims, 3 Drawing Sheets

HYDROSTATIC AXIAL PISTON MOTOR FOR FITTING IN THE HUB OF A DRIVEN WHEEL

BACKGROUND OF THE INVENTION

1. Field of the Invention

The invention relates to a hydrostatic axial piston motor of adjustable swept volume, which axial piston motor is provided for installation in the hub of a wheel for the purpose of driving the same.

2. Description of the Related Art

Such an axial piston motor is known from DE-OS 27 44 936 (FIGS. 1 and 2), the driving toothed wheel of which axial piston motor is mounted one-sidedly on a pin which projects outwards at the closed end, that is, at the base portion of the motor housing, and is thus arranged outside the motor housing in the same way as the remaining elements of the step-down gear unit. In order to establish one-sided mounting of the driving toothed wheel that is sufficiently stable, it is necessary to form the base portion and the pin so that they are correspondingly sturdy. In the same way as the arrangement of the step-down gear unit outside the motor housing and its covering by means of a cover closing the wheel hub on the face, this results in comparatively high outlay in terms of construction and comparatively great dimensions. The adjusting device required to adjust the swept volume is not represented in the case of this known axial piston motor, although DE-PS 32 35 378 shows such an adjusting device of an axial piston motor provided for installation in the hub of a wheel, the free external accessibility of which device is obstructed by the connection block.

SUMMARY OF THE INVENTION

The object of the invention is to develop further an axial piston motor of the kind mentioned by way of introduction in such a way that the outlay in terms of construction is reduced, with comparatively compact dimensions provided, and so that the adjusting device is readily externally accessible.

The step-down gear unit is arranged, according to the invention, inside the motor housing, whereby lesser axial dimensions for the latter are provided and also, as through the two-sided mounting of the driving toothed wheel in the motor housing, a reduction in the outlay in terms of construction and also in the pin diameter, or otherwise a more robust mounting, is provided. The reduction in the pin diameter may render a possible change in the step-down ratio of the step-down gear unit. On account of its arrangement in the region of the axial piston motor that lies opposite the step-down gear unit, the connection block can be set back radially with respect to the motor housing and the adjusting device can be arranged in the region of the motor housing that is created in this way and is free of covering. Said adjusting device is thus freely externally accessible, for example for the purpose of setting a minimum and/or adjusting the swept volume. Connections, such as for example leakage oil connections or connections and control valves for the adjusting device, when that device is hydraulic, can likewise be arranged in the region of the motor housing that is free of covering so that the axial length of the axial piston motor is reduced in comparison with the otherwise necessary arrangement of the connections at the free end face of the connection block.

A further measure for ensuring free access to the adjusting device lies in developing the brake as a multiple disk brake which, in comparison with the single-disk brake on the connection block of the axial piston motor known from DE-OS 27 44 936 (FIG. 1), has smaller radial dimensions with greater braking effect.

In order to keep the diameter of the axial piston motor, according to the invention, as small as possible, the adjusting device preferably extends from the region free of covering obliquely in the direction of the swash plate.

Further features and advantages of the invention follow.

BRIEF DESCRIPTION OF THE DRAWINGS

The invention is described in greater detail in the following with the aid of a preferred exemplary embodiment with reference to the drawings, in which.

DESCRIPTION OF THE PREFERRED EMBODIMENTS

Figure 1:
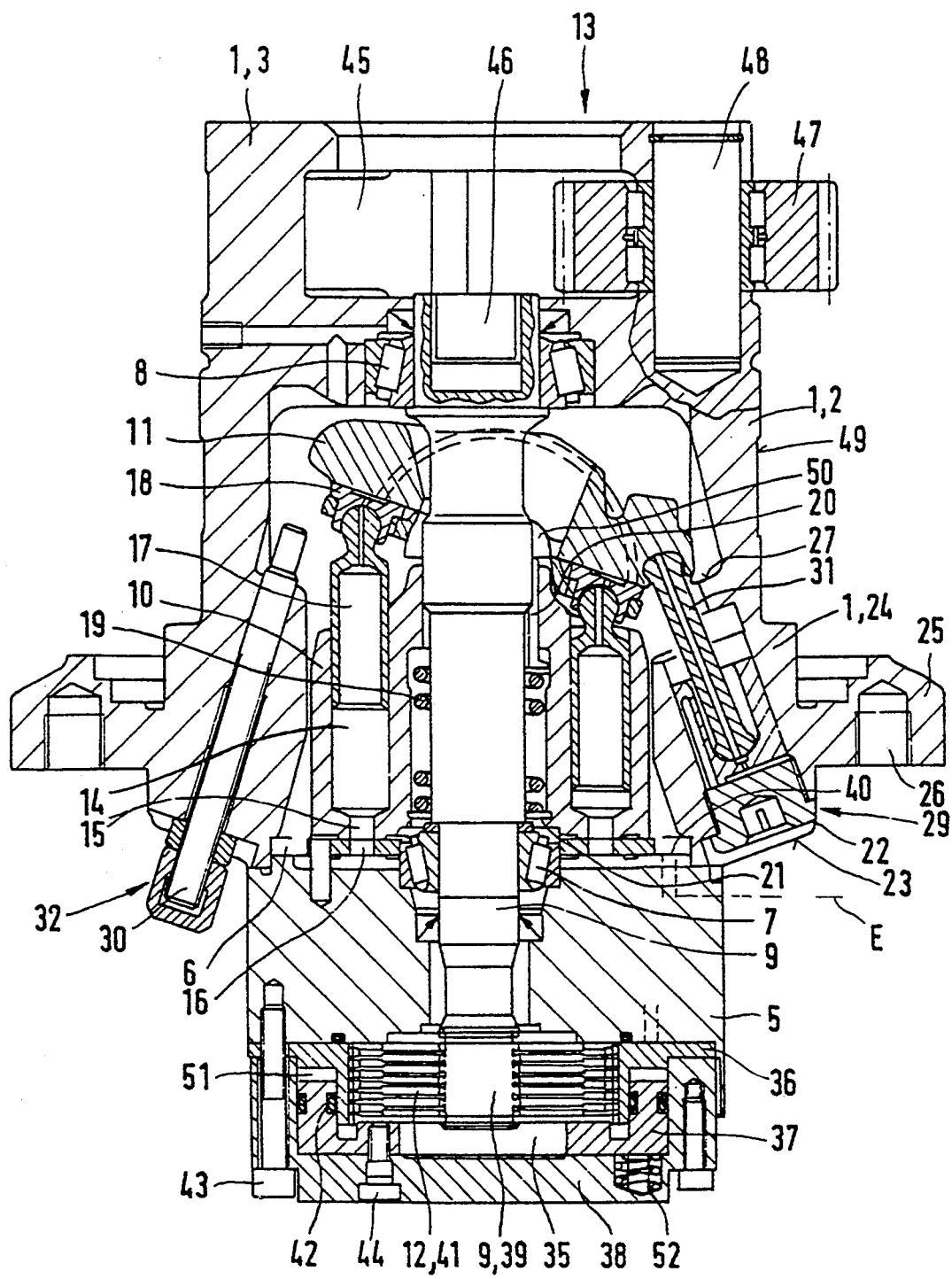
FIG. 1 shows a longitudinal section of the axial piston motor according to the preferred exemplary embodiment of the invention.
Figure 2:
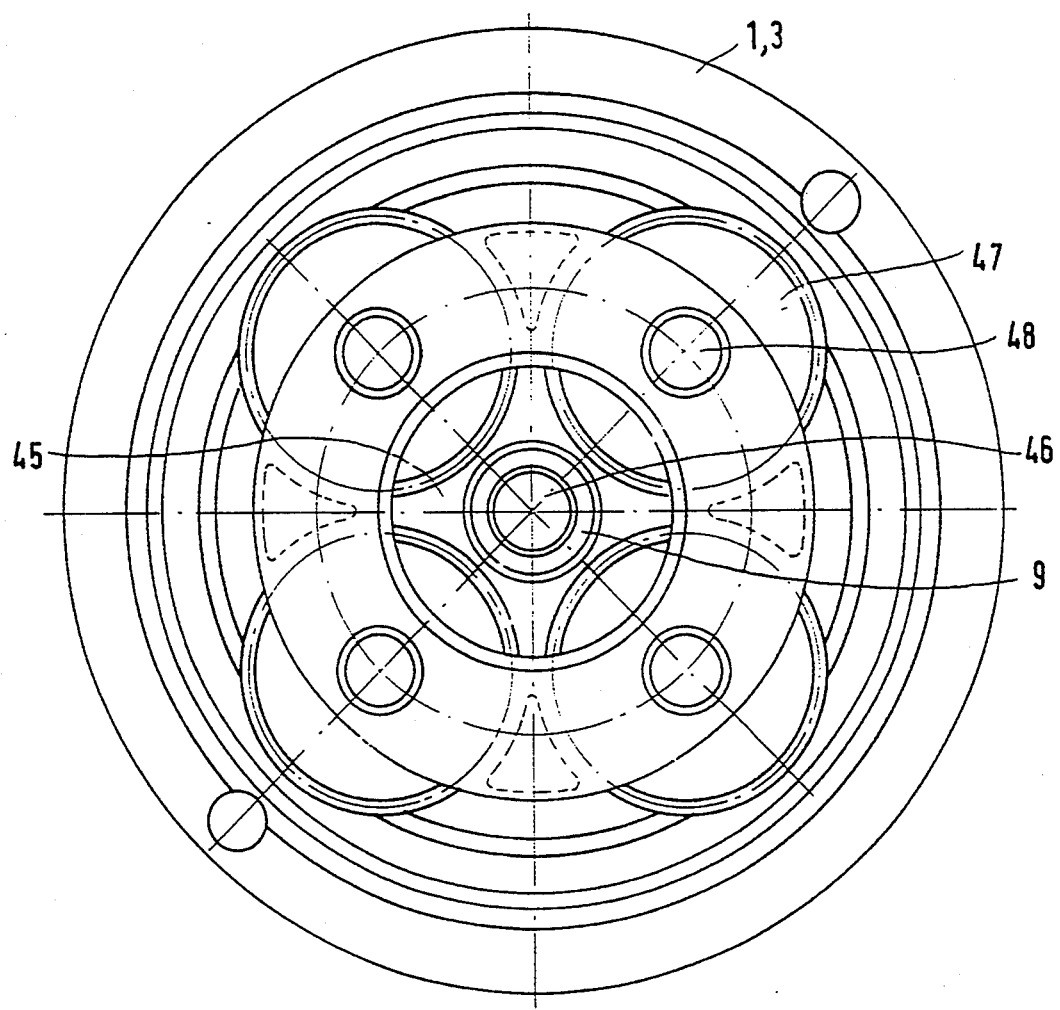
FIG. 2 shows a top view of the axial piston motor represented in FIG. 1.
Figure 3:
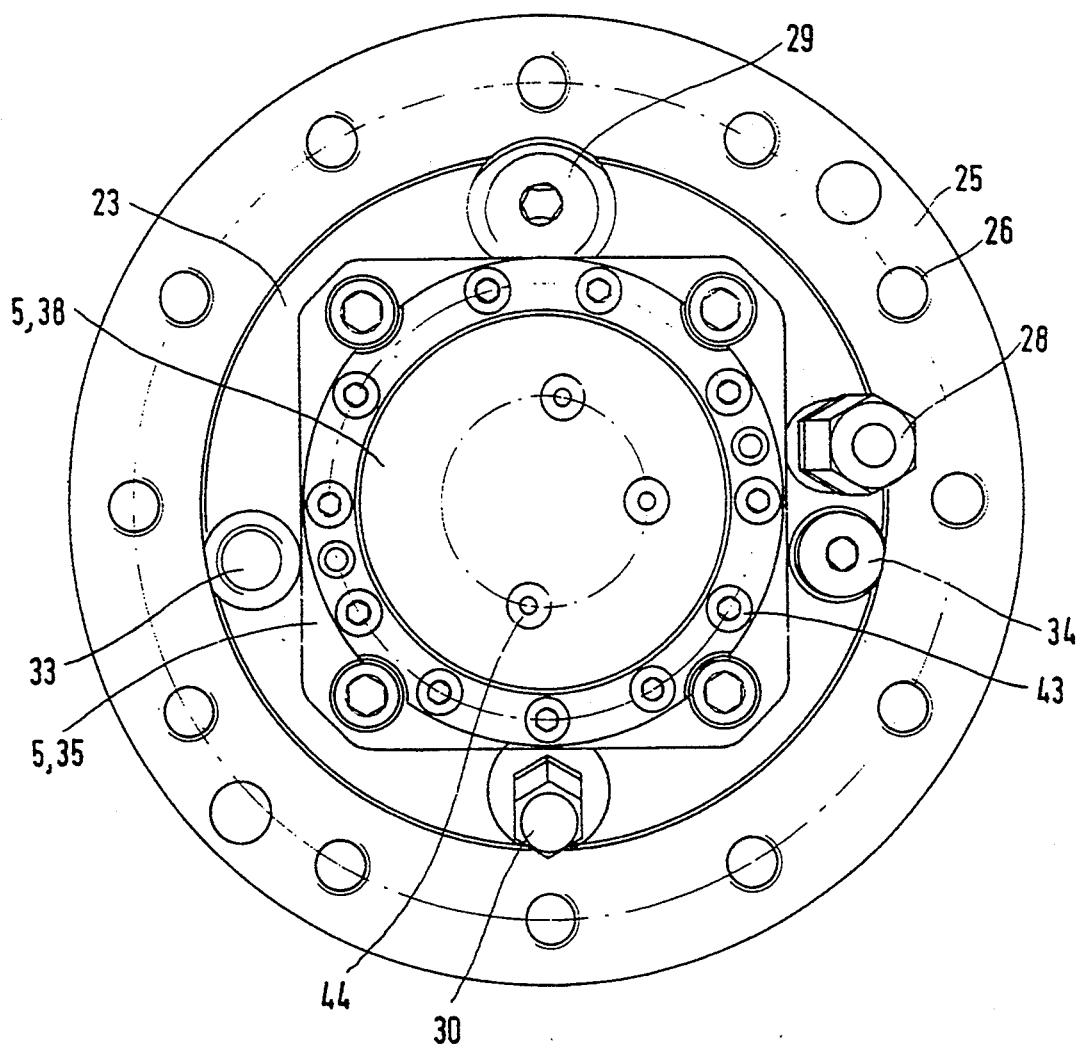
FIG. 3 shows a view from below of the axial piston motor according to FIG. 1.

The axial piston motor represented in the drawing comprises a motor housing 1 which is open at one end and consists of a cylindrical housing wall 2 and a base portion 3, a connection block 5 closing the open end of the motor housing 1 and having a suction and a pressure connection (neither of which are represented), a control plate 6 arranged between connection block 5 and motor housing 1, an output shaft 9 which is rotatably mounted by means of cone bearings 7, 8 in the motor housing 1 and in the connection block 5, a cylinder drum 10 which is arranged on said output shaft 9 so as to rotate with the shaft and is supported rotatably on the control plate 6, a swash plate 11 which is arranged on the motor housing 1 such that it can be swung in relation to said cylinder drum 10, an adjusting device for adjusting the angle of swing of the swash plate 11, a brake 12 arranged on the connection block 5 and also a step-down gear unit 13 in the opposite end region of the motor housing 1.

Formed in a known manner in the cylinder drum 10 there are cylinder bores or chambers 14 which extend axially, are evenly distributed over the periphery and, by way of cylinder channels 15, end in the lower end face of the cylinder drum 10. Two diametrically opposed control nodules 16 are formed in a known manner in the control plate 6, which nodules, in the case of rotation of the cylinder drum 10, establish the connection between the cylinder channels 15 and the suction connection or the pressure connection respectively. Pistons 17 displaceably guided in the cylinder chambers 14 are supported, with their piston ends which lie opposite the cylinder channels 15, by way of guide shoes 18 at the swash plate 11. A compression spring 19, which surrounds the output shaft 9 within a blind bore in the cylinder drum 10, is braced by way of axial pins 20 on a ring 50, having a spherical outer surface, of a withdrawal device for the guide shoes 18 and by way of a ring 21, secured in a ring groove in the wall of the blind bore, urges the cylinder drum 10 in the direction of the control plate 6 in order to keep the drum held against the latter if no oil pressure forces occur.

The connection block 5 is of rectangular cross section and is set back radially with respect to the outer peripheral surface 22 of the housing wall 2 in the region of the open end of the motor housing 1. In this way the end face closing the housing wall 2 at the open end of the motor housing 1 is almost completely free of the covering provided by the connection block 5. This region of the end face that is free of covering and is thus freely externally accessible is denoted with reference numeral 23 and extends radially obliquely outwards as far as the outer peripheral surface 22 in such a way that its distance from an imaginary plane E laid through the connection block 5 crosswise to the output shaft 9 increases with growing radial distance from the output shaft 9.

The housing wall 2 in the region of its open end that is denoted with reference numeral 24, including the region which has the outer peripheral surface 22, has a greater wall thickness than in its remaining region denoted with reference numeral 49. This housing wall region 24 of greater wall thickness includes an annular flange 25 which extends radially outwards, has threaded bores 26, is set back in an axial direction with respect to the outer end face edge 22 and is used for screwing the axial piston motor to a portion (which is not shown) carrying the wheel (which is likewise not shown) to be driven. The inside of the housing wall 2 has an inner surface 27 which is parallel to the skewed region 23 of the end face that is free of covering and which connects the housing wall region 24 of greater wall thickness with that of lesser wall thickness.

In the housing wall region 24 of greater wall thickness respective through-bores are formed at two points lying diametrically opposite each other, said bores extending from the skewed region 23 of the end face that is free of covering, obliquely in the direction of the swash plate 11 and ending at the inner surface 27.

The adjusting device is of conventional design and is not therefore described in greater detail. It comprises an adjusting piston arrangement 29, which can be operated hydraulically by means of a control valve 28, and a stop bolt 30. The adjusting piston arrangement 29 passes through the through-bore, which is on the right in FIG. 1, in the housing wall region 24 of greater wall thickness and with the free end of its adjusting piston 31 is engaged in a form-closing manner with the edge region of the swash plate 11. The control valve 28 in the form of a 3/2-way valve, offset on the same pitch circle by 90° in relation to the adjusting piston arrangement 29, is screwed into a corresponding blind bore in the housing wall region 24 of greater wall thickness, said bore ending in the region 23 of the face that is free of covering, and can be connected to a hydraulic line which is not shown. A hydraulic channel, which is not shown, in the housing wall region 24 of greater wall thickness establishes the connection between the blind bore or the control valve 28 accommodated therein and the through-bore or the adjusting piston arrangement 29 passing through the latter.

The stop bolt 30 having a threaded section is arranged in the through-bore, which is on the left in FIG. 1, in a rotatable and displaceable manner and is longer than the latter. With the aid of an arrangement 32 consisting of two nuts, it is possible to fix the stop bolt 30 in any desired position inside the through-bore and thus with any desired length projecting beyond the inner surface 27. The stop bolt 30 is directed at the edge region of the swash plate 11 and thus restricts the swing movement thereof. The swing position of the swash plate 11, when it rests against the stop bolt 30, determines the minimum swept volume of the axial piston motor that is set in each case.

The housing wall region 24 of greater wall thickness is formed, furthermore, with two diametrically opposed leakage oil connections 33, 34, one of which is arranged next to the control valve 28.

A ring 36, which is L-shaped in cross section, a brake ring 37, which is U-shaped in cross section, and a closure plate 38, which is U-shaped in cross section, are provided for the purpose of securing the brake 12 to the connection block 5. The output shaft 9 passes through a through-bore formed in the connection block 5 and projects out of the latter with an end section 39. With radially outwardly directed limb, the ring 36 sits on the side of the connection block 5 that is remote from the motor housing 1 and is screwed together therewith at 40. The brake 12 is a multiple-disk dry brake, the disks 41 of which are arranged on, so that they cannot rotate with respect to, alternately the end section 39 of the output shaft 9 and the axially extending limb of the ring 36. The brake ring 37 is arranged inside the closure plate 38. Both elements 37, 38 sit on the ring 36, with the axially extending limb of the brake ring 37 being arranged between the axially extending limbs of the ring 36 and the closure plate 38 and being closed in an airtight manner with respect to these by means of two ring seals 42. The closure plate 38 rests with its axially extending limb on the radially extending limb of the ring 36 and is secured to the connection block 5 together with said ring by means of screws 43. The space 35, which is defined by the connection block 5 and the elements 36, 37, 38 and which accommodates the brake 12, communicates with the environment by way of vent connections 44. Located between the radially extending limb of the ring 36 and the axially extending limb of the brake ring 37, there is an annular space 51 which is connected to the internal oil circulation of the axial piston motor in a manner which is not represented. Several tensioned brake springs 52 are arranged in corresponding blind bores in the closure plate 38 and, when the axial piston motor is set at zero swept volume, displace the brake ring 37 in the direction of the brake 12, whereby the latter is operated. As a result of the oil pressure which has built up when the axial piston motor is started up and which also occurs in the annular space 51, the brake ring 37 is displaced against the force of the brake springs 52 and the brake 12 is thereby released.

A recess 45 for a driven toothed wheel which is not shown and which is to be connected with the output shaft 9 so that it cannot rotate with respect to that shaft is formed in the base portion 3 of the motor housing 1. The rotationally fixed connection is effected by means of a pin which is not shown and which is connected to the driven toothed wheel so that it cannot rotate with respect to the driven toothed wheel, and is provided for the purposes of accommodation in a manner fixed against rotation, for example by means of serrations, in a blind bore 46 in the corresponding end section of the output shaft 9. Four driving toothed wheels 47, arranged with equal interspacing on a pitch circle, project into the recess 45 and are rotatably mounted on both sides on respective bearing pins 48 supported on both sides in the base portion 3. These driving toothed wheels 47 are provided for meshing engagement both with the driven toothed wheel and with a toothed construction, which is not shown, on the inside of the wheel hub which is likewise not shown.

The rotary mounting of the wheel hub on the motor housing 1 is effected by means of a rolling bearing, which is not shown, in the housing wall region 49.

We claim:

1. Hydrostatic axial piston motor of adjustable swept volume for installation in the hub of a wheel for the purpose of driving the wheel having a motor housing which is open at one end and is formed as a hub carrier for the purpose of directly mounting the wheel which is to be driven, having a connection block which has a suction and a pressure connection for closing the open end of the motor housing, having an output shaft rotatably mounted in the housing and in the connection block, having an adjusting device for adjusting the swept volume, having a step-down gear unit which is driven by the output shaft, has a driving toothed wheel for the drive of the wheel hub and is arranged in the region of the axial piston motor that lies opposite the connection block, and having a brake mounted on the connection block for braking the output shaft, characterised in that the step-down gear unit (13) is mounted inside the motor housing (1, 2) with a two-sided mounting of the driving toothed wheel (47) and in that the connection block (5) is set back radially with respect to the motor housing (1), and a region (23) of the motor housing (1, 2) is constructed to be free of a covering so that there is an adjusting means (28, 29, 30) which is adjacent the region so as to be freely externally accessible.

2. Axial piston motor according to claim 1, characterised in that the brake is formed as a multiple disk brake (12).

3. Axial piston motor according to claim 1, characterised in that the adjusting means (28, 29, 30) extends from the region (23) which is free of the covering obliquely into the interior space of the motor housing (1).

4. Axial piston motor according to claim 1, characterised in that the adjusting means (28, 29, 30) comprises an adjusting piston arrangement (29) which is externally adjustable.

5. Axial piston motor according to claim 4, characterised in that the adjusting means (28, 29, 30) comprises a control valve (28) for hydraulic operation of the adjusting piston arrangement (29).

6. Axial piston motor according to claim 1, characterised in that the adjusting means (28, 29, 30) comprises a stop (30) for the determination of a minimum swept volume setting.

7. Axial piston motor according to claim 1, characterised in that at least one leakage oil connection (33, 34) is arranged in the region (23) of the motor housing (1) that is free of covering, so as to be freely externally accessible.

* * * * *